United States Patent
Larson et al.

(10) Patent No.: US 10,485,179 B2
(45) Date of Patent: Nov. 26, 2019

(54) CONVEYOR DRUM FILLER FOR DEBRIS EXCLUSION

(71) Applicant: Deere & Company, Moline, IL (US)

(72) Inventors: Matthew G. Larson, East Moline, IL (US); Mark D. Bowers, East Moline, IL (US); Justin D. Bruns, Port Byron, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/675,267

(22) Filed: Aug. 11, 2017

(65) Prior Publication Data

US 2019/0223382 A1    Jul. 25, 2019

(51) Int. Cl.
| | | |
|---|---|---|
| *A01F 7/06* | (2006.01) | |
| *A01F 12/44* | (2006.01) | |
| *A01D 61/00* | (2006.01) | |

(52) U.S. Cl.
CPC .............. *A01F 12/442* (2013.01); *A01F 7/06* (2013.01); *A01D 61/004* (2013.01)

(58) Field of Classification Search
CPC . A01F 7/02; A01F 7/06; A01F 12/442; A01D 61/002; A01D 61/004; A01D 61/006
USPC ...... 198/300, 310, 780; 193/37; 56/156, 157
See application file for complete search history.

(56) References Cited

U.S. PATENT DOCUMENTS

| | | | | |
|---|---|---|---|---|
| 2,263,439 | A * | 11/1941 | Hansen | .................... F26B 13/14 |
| | | | | 193/37 |
| 4,003,191 | A | 1/1977 | Todd et al. | |
| 4,217,951 | A * | 8/1980 | Engel | ................. B22D 11/1287 |
| | | | | 164/448 |
| 4,402,390 | A * | 9/1983 | Feeney | .................. B65G 39/04 |
| | | | | 193/37 |
| 4,969,548 | A * | 11/1990 | Kornylak | ............... B65G 39/06 |
| | | | | 193/35 R |
| 5,980,383 | A | 11/1999 | Medley | |
| 7,213,701 | B2 * | 5/2007 | Deur | ...................... B65G 39/12 |
| | | | | 193/37 |
| 8,672,116 | B2 * | 3/2014 | Calloway | ............... B65G 39/09 |
| | | | | 193/35 R |

FOREIGN PATENT DOCUMENTS

| | | |
|---|---|---|
| CN | 1861500 | 11/2006 |
| CN | 106915593 | 7/2017 |
| DE | 7731162 U1 | 1/1978 |
| WO | 2012110090 A1 | 8/2012 |

OTHER PUBLICATIONS

European Search Report for 18187033.8-1006 dated Dec. 13, 2018.

* cited by examiner

*Primary Examiner* — Leslie A Nicholson, III
(74) *Attorney, Agent, or Firm* — Rathe Lindenbaum LLP

(57) ABSTRACT

A plastic filler for a cylinder conveyor, wherein the cylindrical conveyor includes a drum supported on a central shaft and defines a void therebetween, and wherein the plastic filler at least partially fills the void and thereby prevents the entry of contaminants into the void.

20 Claims, 5 Drawing Sheets

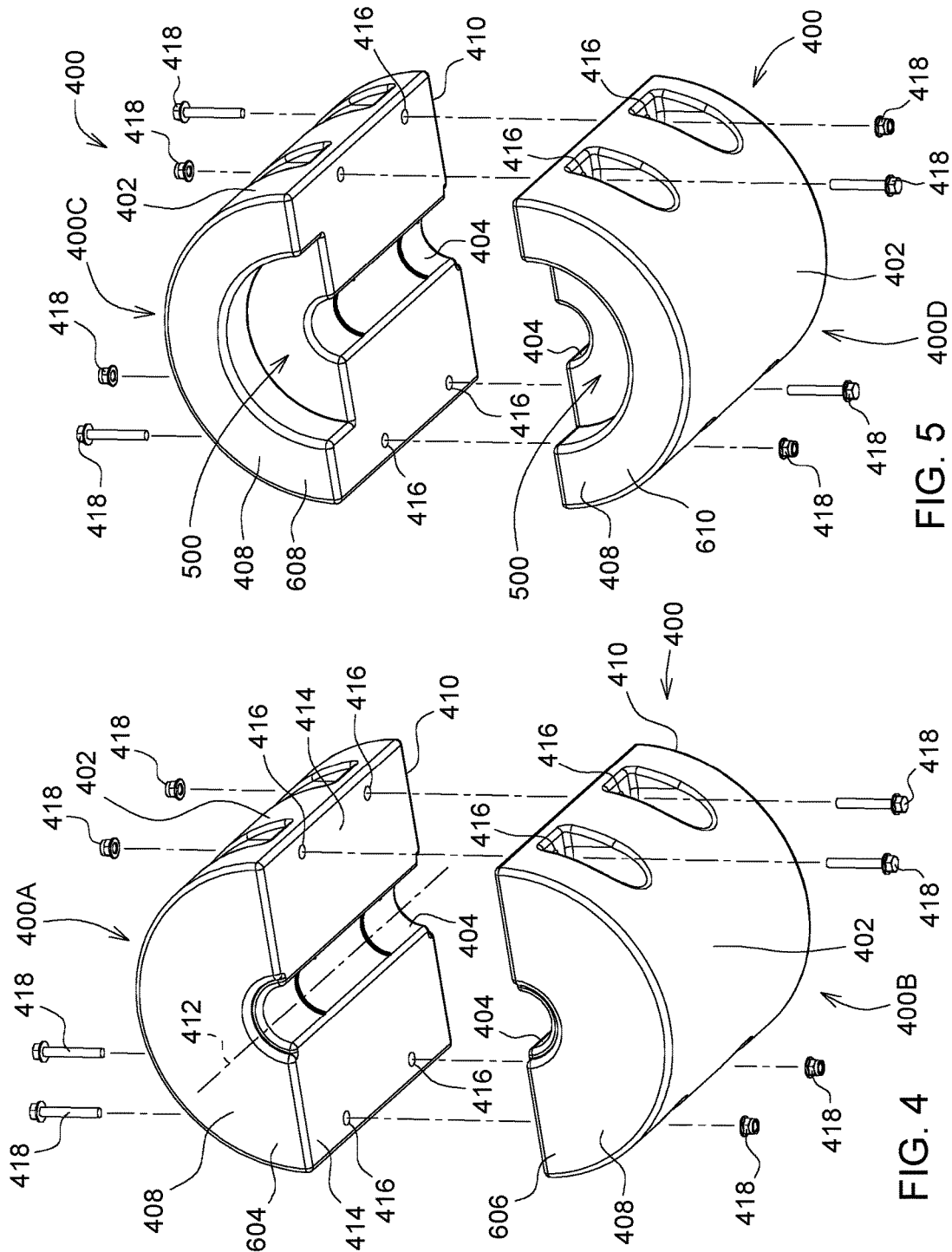

CONVEYOR DRUM FILLER FOR DEBRIS EXCLUSION

FIELD OF THE INVENTION

This invention relates generally to agricultural harvesters. More particularly it relates to rotary crop conveyors such as drum conveyors. Even more particularly it relates to beaters and feed accelerators.

BACKGROUND OF THE INVENTION

Agricultural harvesters, such as agricultural combines, are designed to travel through agricultural fields harvesting crops. Agricultural combines receive crop severed from the ground and convey it to threshing, separating and cleaning devices within the agricultural combine.

In order to convey the cut crop material through the combine a variety of conveyors are used. In one typical arrangement, the conveyors comprise a rotating cylinder with protrusions extending from its outermost surface to engage the cut crop material and move it rearward.

These cylinders may be driven at high speed (e.g. 200-1200 RPM) in order to throw the cut crop material further.

Unless these cylinders are well-balanced, the high speed of rotation can cause them to oscillate, shaking the combine, and damaging components.

One significant source of imbalance is the accumulation of dirt, chaff, straw, and crop within the hollow interior of the cylinder. This material filters into the cylinder through open ends of the cylinder, through access holes, or gaps between multiple sections of the cylinder. The accumulation will dry, become hardened, and adhere to the inner surface of the cylinder.

One way to reduce this accumulation of material is to fill the cylindrical voids with rubber, expanded foam, or other materials. Unfortunately, this material significantly increases the weight of the cylinders. Further, since it is "glued" to the inner surfaces of the cylinder and the driveshaft upon which the cylinder is mounted, the rotating cylinder conveyors cannot be easily disassembled.

What is needed is a filler for a cylindrical conveyor that can be easily inserted and removed for maintenance purposes, is lightweight and effectively fills a void inside the cylindrical conveyor to exclude contaminants that would otherwise form within the cylindrical conveyor, imbalance the conveyor, and make the cylindrical conveyor difficult to clean.

It is an object of this invention to provide such an arrangement.

SUMMARY OF THE INVENTION

In accordance with a first aspect of the invention a plastic filler is provided for a cylindrical conveyor, wherein the cylindrical conveyor comprises an elongate central shaft, a plurality of radial supports supported on the shaft in a spaced apart relation along the shaft, and a drum supported on the supports in positions that are coaxial with the central shaft, wherein the plastic filler has an outer surface that is generally cylindrical and immediately adjacent to an inner surface of the drum, an inner surface adjacent to and surrounding the central shaft, a first end adjacent to a first one of the plurality of radial supports, and a second end adjacent to a second one of the plurality of radial supports whereby the plastic filler thereby fills a void and excludes contaminants from between the central shaft and the drum.

The plastic filler may include a hollow thermoplastic body having a cylindrical outer surface.

The plastic filler may include two or more hollow thermoplastic bodies in an abutting relationship that together define a cylindrical outer surface.

The plastic filler made to find a generally cylindrical outer surface that is closely spaced to an inner surface of the drum over substantially an entire length of the plastic filler, and a cylindrical inner surface that extends around and is closely spaced to the central shaft over substantially an entire length of the central shaft.

The plastic filler may include two hollow bodies that are fixed to each other with at least one fastener.

The drum may include one or more individual cylinder segments that are removable from the cylindrical conveyor to thereby provide an opening in the drum, and the plastic filler may be sized for insertion into cylindrical conveyor through the opening in the drum.

The plastic filler may include two hollow bodies that can be inserted individually and sequentially into the cylindrical conveyor through the opening.

The two hollow bodies maybe fixed to each other with fasteners once they are inserted into the drum.

In accordance with a second aspect of the invention, a cylindrical conveyor may include an elongate central shaft, a plurality of radial supports supported on the shaft in a spaced apart relation along the longitudinal length of the shaft, a drum supported on the supports in a position that are coaxial with the central shaft, and a plastic filler as described herein.

In accordance with a third aspect of the invention, an agricultural combine may include a chassis supported on at least one wheel, a feederhouse supported on the chassis, and configured to convey cut crop material from an agricultural harvesting head to a threshing, separating, and cleaning mechanism, and at least one cylindrical conveyor supported on the chassis as described herein.

BRIEF DESCRIPTION OF THE DRAWINGS

FIG. 4 is an exploded view of a first conveyor drum filler for the rotary conveyor cylinders of FIGS. 1-2.

FIG. 5 is an exploded view views of a second conveyor drum filler for the rotary conveyor cylinders of FIGS. 1-2.

DETAILED DESCRIPTION OF THE PREFERRED EMBODIMENTS

Figure 1:
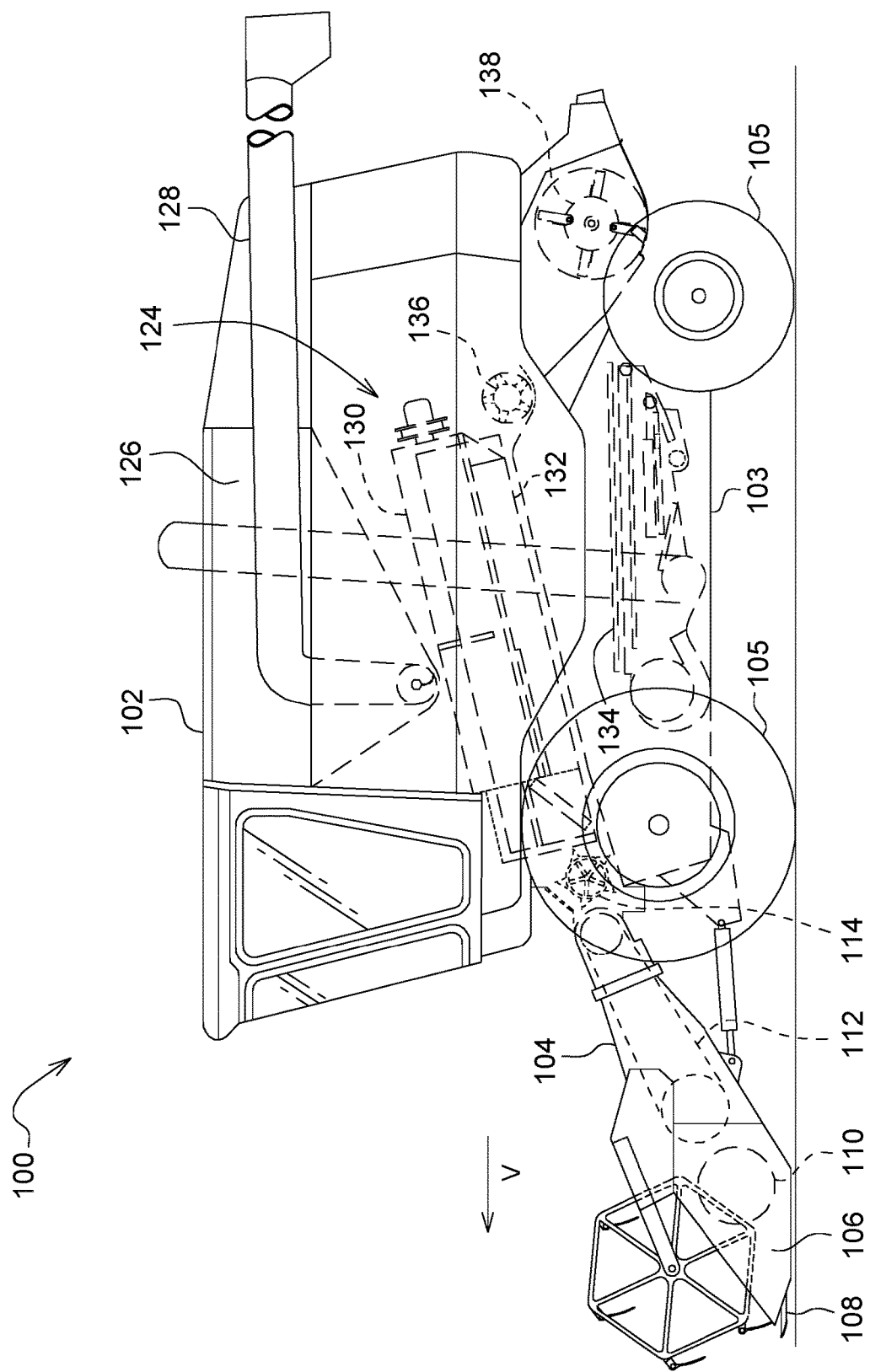
FIG. 1 illustrates an agricultural harvester in side view in accordance with the present invention.

In FIG. 1, an agricultural harvester 100 comprises an agricultural combine 102 having a feederhouse 104 extending from the front of the agricultural combine 102, and the chassis 103 supported on at least one wheel 105 for travel through an agricultural field to harvest crops, and an agricultural harvesting head 106 supported on forward end of the feederhouse 104. The agricultural harvester 100 travels in a direction of travel "V" through the field to harvest crop.

Crop plants are severed by reciprocating knife 108 that extends across the width of the agricultural harvesting head 106. The cut crop material falls backward on to a conveyor 110.

The conveyor 110 carries cut crop material to the middle of the agricultural combine 102 and transmits it into a forward opening of the feederhouse 104.

A conveyor 112 inside the feederhouse 104 carries the cut crop material rearward and upward, through a rear opening in the feederhouse and into a rotary cylinder conveyor 114.

The rotary cylinder conveyor 114 throws the cut crop material into a threshing, separating, and cleaning mechanism 124, which then threshes the cut crop material, separates the cut crop material into grain and material other than grain (MOG), and cleans the grain. The rotary cylinder conveyor 114 is driven in rotation about a laterally extending and generally horizontal rotational axis.

The clean grain is carried upward into a grain reservoir 126 where it is stored for later unloading through and unloading conveyor 128.

The threshing, separating, and cleaning mechanism 124 includes an elongate cylinder 130 oriented in a longitudinal direction (i.e. generally parallel to the direction of travel "V" of the agricultural harvester 100). The lower portion of the cylinder 130 is disposed within a semicircular concave 132 (also known as a threshing basket) that also extends in a longitudinal direction. Cut crop material is received in a gap between the cylinder 130 and the concave 132 and is carried rearward between the two.

Grain separated from MOG falls through holes in the concave 132 and into a cleaning shoe 134. The MOG is carried rearward in the gap between the cylinder 130 and the concave 132 until it is released at the rear of the cylinder and concave.

MOG released at the rear of the cylinder in concave is received in a second rotary cylinder conveyor 136. The second conveyor 136 throws the MOG rearward where it is deposited upon the ground and/or passes through a chopper 138, which chops the MOG and distributes the chopped MOG over the ground. The second conveyor 136 is driven in rotation around a laterally extending and generally horizontal rotational axis.

Figure 2:
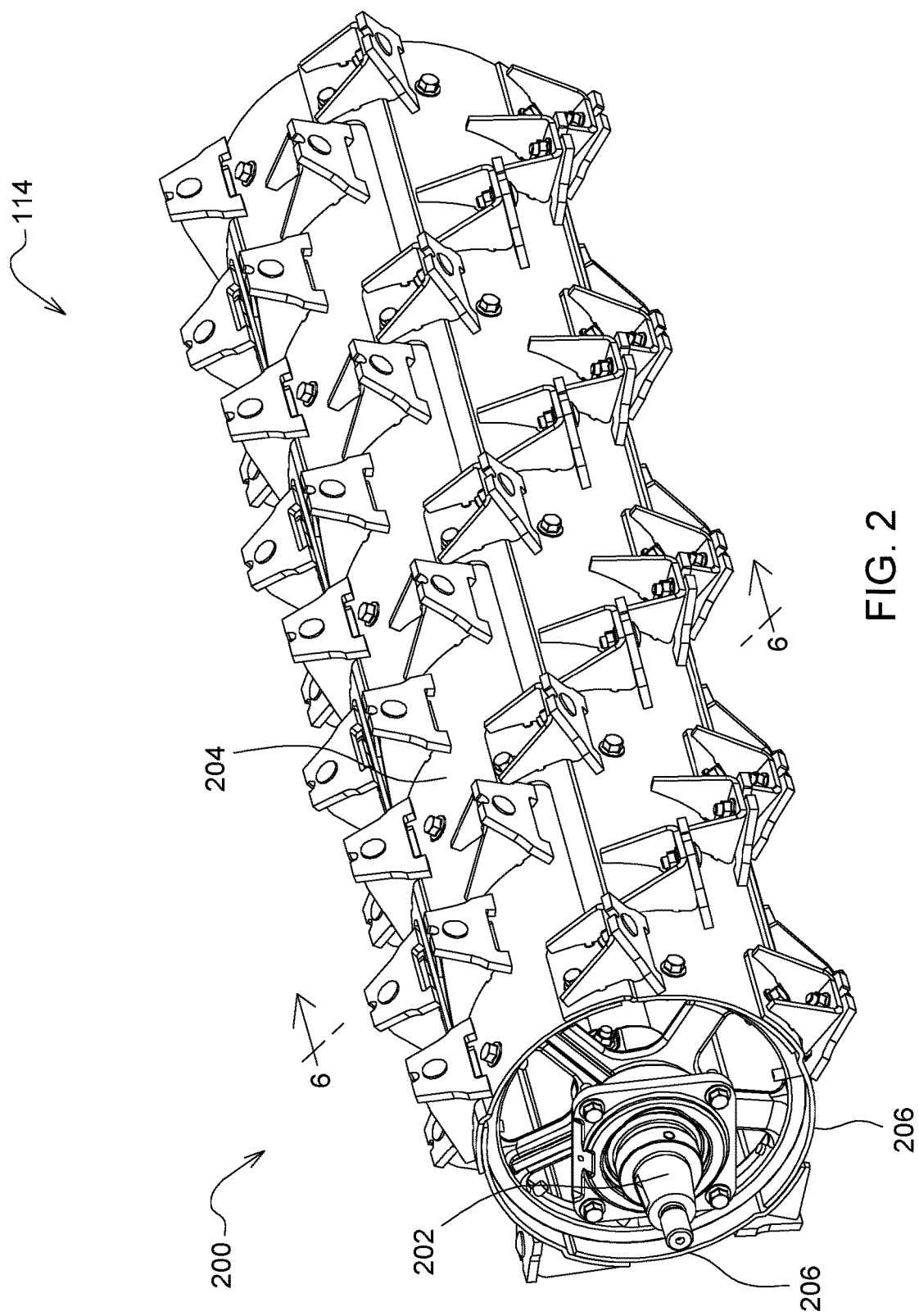
FIG. 2 is a perspective view of a rotary conveyor cylinder of the agricultural harvester of FIG. 1 in accordance with the present invention.
Figure 3:
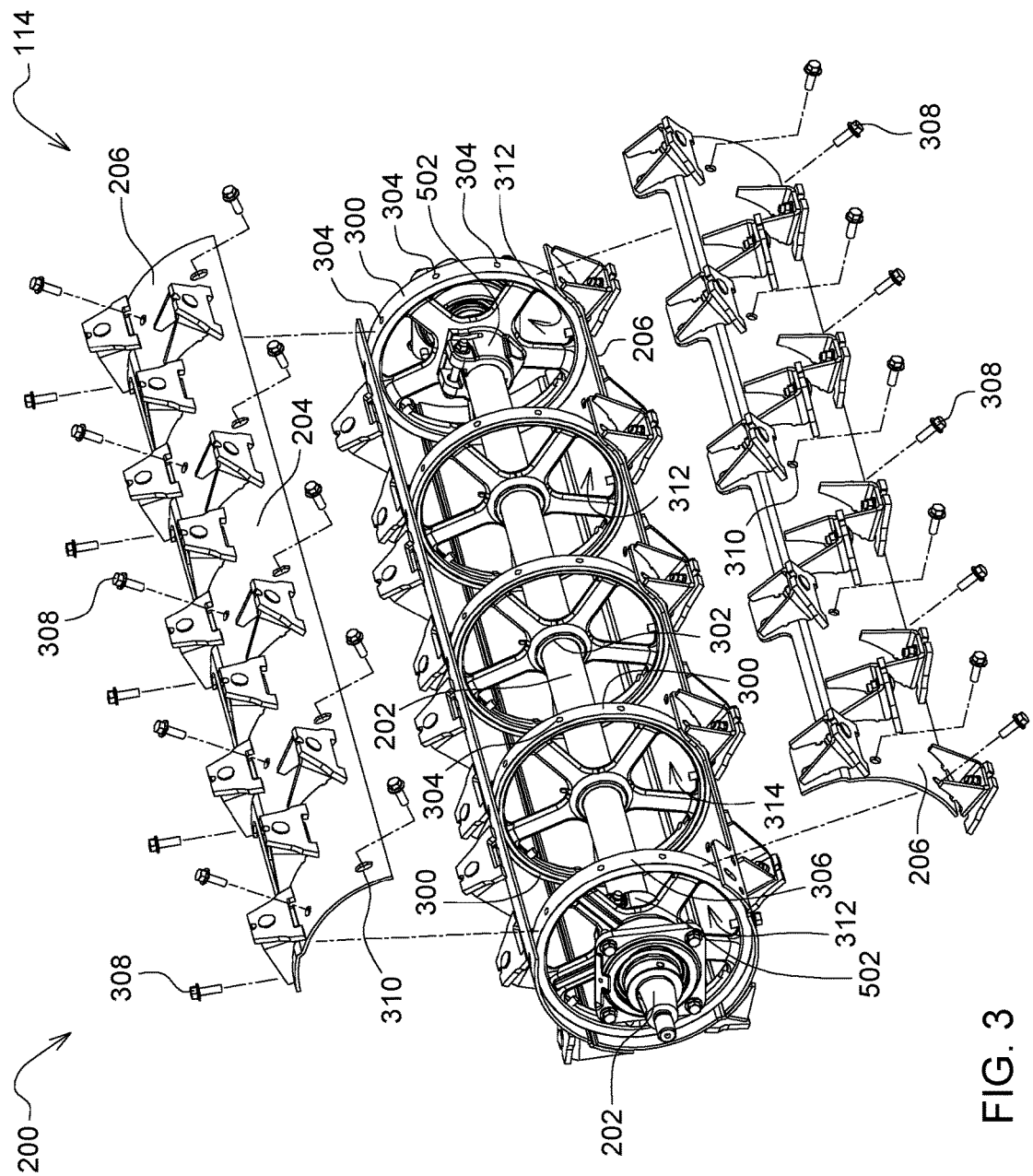
FIG. 3 is an exploded perspective view of the rotary conveyor cylinders of FIGS. 1-2.

Cylinder 200 is shown in FIG. 2 and in exploded view in FIG. 3. The cylinder 200 is typical of both the rotary cylinder conveyors described above.

The cylinder 200 includes an elongate central shaft 202 on which a cylindrical drum having a cylindrical surface 204 is mounted. The cylindrical drum is comprised of a plurality of individual cylinder segments 206 that extend the length of the cylinder 200. The cylinder segments 206 collectively define the cylindrical surface 204 of the cylindrical drum.

There are six cylinder segments 206. Each cylinder segment 206 extends partway around the circumference of the elongate central shaft 202, enclosing an arc of 60°. When assembled as shown in FIG. 2, each cylinder segment 206 abuts or slightly overlaps its adjacent cylinder segment 206 to create a continuous, generally cylindrical outer surface. In the embodiment illustrated in FIG. 2, five of these cylinder segments 206 are required to provide a continuous cylindrical surface 204 of 360° that extends about and is concentric with the central shaft 202.

As best shown in FIG. 3, five radial supports 300 are disposed on the elongate central shaft 202. Each of the radial supports 300 has a central hole 302 that is sized to receive the elongate central shaft 202. A small sliding clearance between the central shaft 202 and the central hole 302 is provided to permit the radial supports 300 to be assembled on the elongate central shaft 202 by inserting each support onto a free end of the central shaft and sliding them into position.

Each support 300 is generally flat, planar, and circular having a circular central hole 302 that is concentric with the outer edge of the support 300. The outer surface 306 of each support 300 is generally cylindrical and is formed as a narrow ring. Mounts 304 (here shown as threaded holes) are formed in the outwardly facing surface of the outer surface 306 and are distributed evenly around the circumference of the outer surface 306.

To assemble the cylinder 200, the radial supports are first mounted on the elongate central shaft 202 in a spaced-apart relation. The cylindrical surface 204 is then assembled by fastening each of the six cylinder segments 206 to the outer surfaces 306 of the supports. Fasteners 308 (here shown as bolts) extend through corresponding holes 310 in each of the cylinder segments 206, and are fixed to mounts 304. In this manner, fasteners 308 secure each of the cylinder segments 206 to the outer edge 308 of each of the supports 300.

A large empty space exists on the inside of the cylinder formed from the cylinder segments 206. The shaft 202 and the supports 300 are relatively small, and thus leave a large empty space. Dirt, MOG, chaff, seed, and other unwanted material can easily pass through gaps between the cylinder segments 206 and apertures 312 in each of the supports 300. This material accumulates on the bottom inside surfaces 314 of the individual cylinder segments 206, adheres to these surfaces when the harvester 100 is stopped, and causes unbalanced rotation when the harvester 100 and the cylinder 200 started up.

To prevent this unbalanced rotation, fillers 400 are provided that fill the large empty space on the inside of the cylinder. These fillers 400 are illustrated in FIGS. 4-6.

The function of the fillers is to fill a void that would otherwise be at least partially filled by unwanted matter and cause unbalanced rotation of the rotary cylinder conveyor 114. The more that void is filled, the less space there is for unwanted material.

Figure 6:
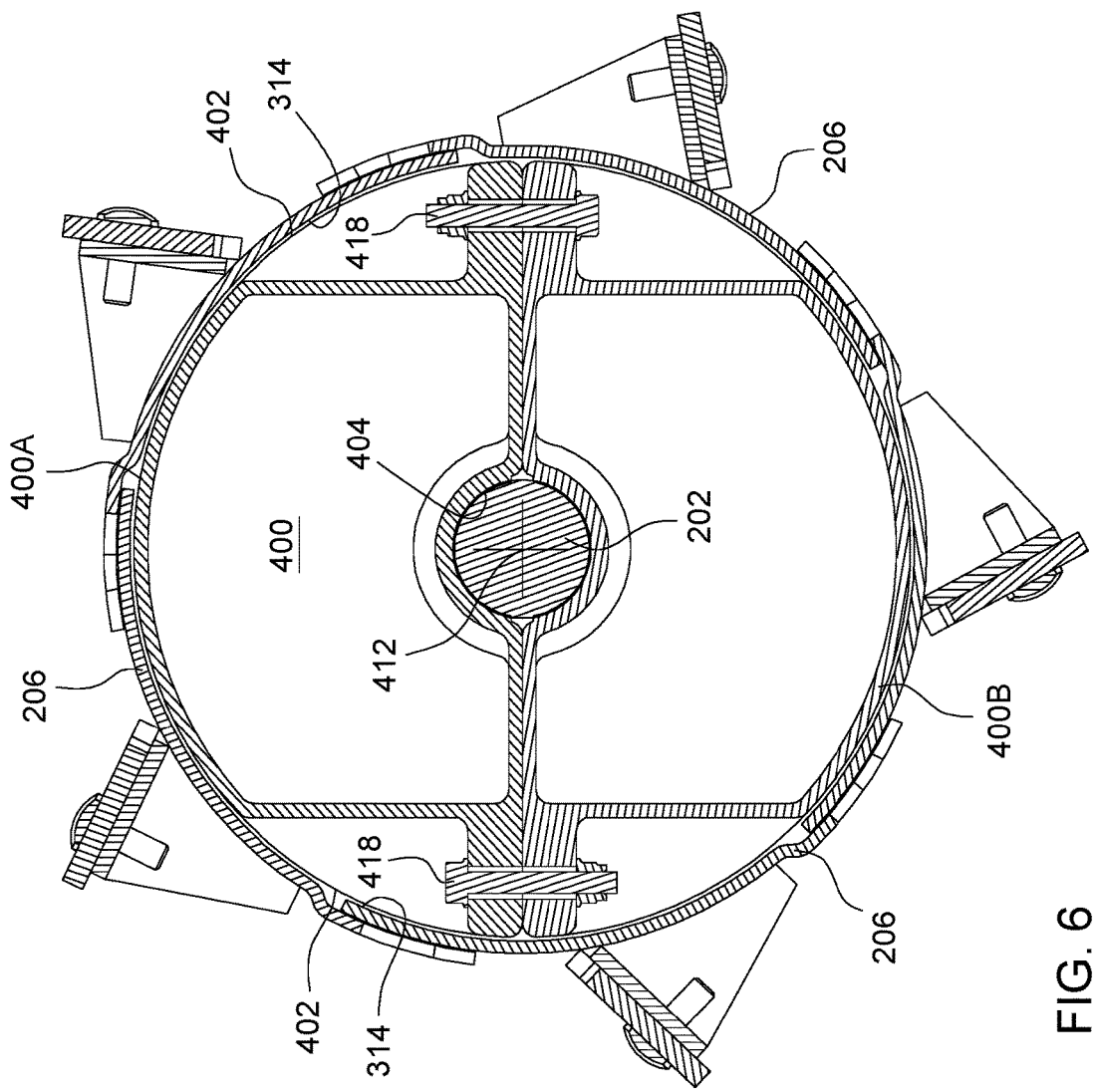
FIG. 6 is a cross-sectional view of a conveyor drum (with fillers) taken at section line 6-6 in FIG. 2.

For that reason, each filler 400 has an outwardly facing convex surface 402 that closely approximates the inner cylindrical surface collectively defined by the cylinder segments 206 (see FIG. 6). For that reason also, each filler 400 has a concave surface 404 that is cylindrical and closely approximates the outer cylindrical surface 406 of the elongate central shaft 202 (see FIG. 6). In the arrangement shown in FIG. 6, the convex surface and the concave surface are concentric about a longitudinal rotational axis of central shaft 202.

Each filler 400 has two axial ends: a first end 408 that is planar and closely approximates an axial side surface of a first support 300, and a second end 410 that is planar and closely approximates an axial side surface of an adjacent, second support 300.

Each filler 400 is preferably lightweight, since it functions to displace loose matter. For that reason the body of the filler is preferably made of plastic, preferably a thermoplastic. It is preferably hollow. It is preferably formed by a blow-molding or rotational molding. These manufacturing processes provide a high overall volume for the part (and thus high displacement of loose matter), yet still be lightweight, inexpensive, and have a thin wall structure. These processes also permit the filler 400 to be engineered with a relatively complex outer surface contour to more effectively and closely follow the abutting/adjacent inner surface contours of the cylinder 200 and the central shaft 202, thereby filling a greater volume and more effectively displacing MOG, dirt, and other light matter at low cost.

Since the sole or primary function of the filler is merely to fill a void and thereby exclude loose contaminants from entering and accumulating in the cylindrical conveyor, it does not need to be a structural member or provide structural strength to other components. A filler in the form of a lightweight hollow plastic body is particularly suited to this application.

In one arrangement (not shown), the filler 400 can be in the form of a cylindrical outer wall having outer surface that closely accommodates or abuts the inner surface of the cylinder 200, and a cylindrical concentric hole sized to closely accommodate or abut the shaft 202, and two opposing end walls that are generally perpendicular to the cylindrical concentric hole and that closely accommodate or abut the facing side surfaces of two adjacent radial supports 300.

In this arrangement, substantially the entire empty space between two adjacent radial supports 300 extending from the outer surface of shaft 202 and the inner surface of the individual cylinder segments 206 could be almost entirely filled with the filler 400, thus substantially displacing any otherwise empty space between two adjacent radial supports 300.

This arrangement would be assembled by sliding a radial support 300 onto the shaft, then a filler 400, then a second radial support 300, then a filler 400, etc., until all the radial supports 300 and the fillers 400 were on the shaft. At this point, each of the five individual cylinder segments 206 would be fixed to the radial supports to create the cylinder 200.

There are drawbacks to this configuration, particularly when an existing cylinder 200 inside to combine is to be retrofitted with fillers 400. To retrofit an existing cylinder 200 with fillers 400 configured in this manner would be impossible without removing the entire cylinder 200 from the combine, removing all the individual cylinder segments 206, and then sliding all of the radial supports 300 off the shaft 202, then reassembling the entire cylinder 200. For that reason, another arrangement of the fillers 400 is provided that can be easily retrofitted into a cylinder 200 already installed in the combine.

In this alternative arrangement, each filler 400 is in the form of two individually formed half cylinders that are sized to be inserted into an existing cylinder 200 on a combine. To do this retrofit, one or more of the individual cylinder segments 206 is unbolted from the cylinder 200 already mounted on a combine to thereby create a side opening in the cylinder 200.

A first half cylinder and then a second half cylinder of the filler 400 are then sequentially inserted through this side opening and maneuvered around the central shaft 202 until they are in the relative position shown in FIG. 6. In one configuration of this alternative arrangement, the filler 400 (shown in FIG. 4) is formed of two abutting half cylinders 400A, 400B that together define a cylindrical filler 400. In another configuration, the filler 400 (shown in FIG. 5) is formed of two abutting half cylinders 400C, 400D.

Each of the half cylinders 400A, 400B, are identical. They are made in the same mold. Each of them has two flat end walls 408 that are perpendicular to a longitudinal axis 412. Each half cylinder 400A, 400B is semi cylindrical, extending 180° around longitudinal axis 412. Each half cylinder 400A, 400B has two surfaces 414 that are coplanar. Longitudinal axis 412 lies in the plane defined by the surfaces 414. Half cylinders 400A, 400B can be rotated into a position (shown in FIG. 4) in which surfaces 414 of half cylinder 400A are parallel to and abut corresponding surfaces 414 of half cylinder 400B. In this position, and surfaces 408 of half cylinders 400A, 400B are coplanar.

Four apertures 416 are provided on opposite sides of half cylinders 400A, 400B such that apertures 416 in half cylinder 400A are aligned with apertures 416 and half cylinder 400B to permit fasteners 418 to extend through the aligned apertures 416 and secure the two half cylinders 400A, 400B together. Fasteners 418 may be permanent fasteners, such as rivets, or they may be (as shown herein) removable and replaceable, such as threaded fasteners, including screws, nuts, bolts, or the like.

FIG. 5 shows a third alternative arrangement identical to the arrangement of FIG. 4 in both construction, operation and use with one difference: a semi-cylindrical recess 500 is provided in one of the end surfaces 408 of each of the half cylinders 400C, 400D. Together these half cylindrical recesses 500 define a cylindrical recess. The cylindrical recess is provided to surround and accommodate a clamp 502 (FIG. 3). Clamp 502 surrounds central shaft 202 and fixes a radial support 300 disposed at the end of the cylinder 200 to the central shaft 202.

FIG. 6 shows the relative orientation and spacing of the filler 400 with respect to the central shaft 202 and the inner cylindrical surface of the drum. The spacing between the filler 400 and the inner surface of the drum is small. The surfaces may abut or they may not.

The gaps between the filler 400, the central shaft 202 and the inner cylindrical surface of the drum are preferably large enough to permit the cylinder 200 to be readily assembled. At the same time, they cannot be so large that enough dirt, MOG, seed, and other contaminants can accumulate in the gap during operation and cause damaging rotational imbalance of the cylinder 200.

The embodiments disclosed in this application explain at least one arrangement of the invention in sufficient detail to permit someone skilled in the art to make at least one embodiment of the invention. Other arrangements and embodiments are possible, even expected. The invention itself is defined by the claims.

The invention claimed is:

1. A plastic filler for a cylindrical conveyor comprising an elongate central shaft, a plurality of radial supports supported on the shaft in a spaced apart relation along the shaft, and a drum supported on the supports in positions that are coaxial with the central shaft, the plastic filler comprising:
   a cylindrical outer surface to be positioned immediately adjacent to an inner surface of the drum;
   an inner surface to be positioned adjacent to and surrounding the central shaft;
   a first end to be positioned adjacent to a first one of the plurality of radial supports; and
   a second end to be positioned adjacent to a second one of the plurality of radial supports, such that the plastic filler fills a void and excludes contaminants from between the central shaft and the drum,
   wherein the plastic filler comprises two or more thermoplastic bodies in an abutting relationship about an axis along which the elongate central shaft is to extend through the plastic filler, each of the bodies extending less than 360° about the axis, wherein the two or more thermoplastic bodies collectively extend 360° about the axis and define the cylindrical outer surface.

2. The plastic filler of claim 1, wherein the two or more thermoplastic bodies comprise a thermoplastic body having an integral polymeric wall completely surrounding and enclosing a hollow interior, the integral polymeric wall forming a portion of the cylindrical outer surface.

3. The plastic filler of claim 2, wherein the hollow interior is empty, being filled with air.

4. The plastic filler of claim 1, wherein the plastic filler defines a generally cylindrical outer surface that is closely spaced to an inner surface of the drum over substantially an entire length of the plastic filler, and a cylindrical inner surface that extends around and is closely spaced to the central shaft over substantially an entire length of the central shaft.

5. The plastic filler of claim 1, wherein the two or more thermoplastic bodies comprise two thermoplastic bodies that are fixed to each other with at least one fastener.

6. The plastic filler of claim 5, wherein the two thermoplastic bodies each comprise an aperture projecting into the cylindrical outer surface and receiving the at least one fastener.

7. The plastic filler of claim 1, wherein the two or more thermoplastic bodies comprise two semi cylindrical polymeric bodies, the semi cylindrical polymeric bodies being joined along an interface extending in a plane to contain the axis.

8. The plastic filler of claim 1, wherein the first end comprises a cylindrical recess having a face facing in a direction parallel to the axis away from an axial center of the plastic filler.

9. A cylindrical conveyor comprising:
an elongate central shaft;
a plurality of radial supports supported on the shaft in a spaced apart relation along the longitudinal length of the shaft;
a drum supported on the supports in a position that are coaxial with the central shaft and
a plastic filler comprising
an outer surface that is generally cylindrical and immediately adjacent to an inner surface of the drum;
an inner surface adjacent to and surrounding the central shaft;
a first end adjacent to a first one of the plurality of radial supports; and
a second end adjacent to a second one of the plurality of radial supports, wherein whereby the plastic filler thereby fills a void and excludes contaminants from between the central shaft and the drum,
wherein the drum comprises one or more individual cylinder segments that are removable from the cylindrical conveyor to thereby provide an opening in the drum, and further wherein the plastic filler is sized for insertion into cylindrical conveyor through the opening in the drum.

10. The plastic filler of claim 9, wherein the plastic filler comprises two hollow bodies that can be inserted individually and sequentially into the cylindrical conveyor through the opening.

11. The plastic filler of claim 10, where the two hollow bodies can be fixed to each other with fasteners once they are inserted into the drum.

12. A cylindrical conveyor comprising:
an elongate central shaft;
a plurality of radial supports supported on the shaft in a spaced apart relation along the longitudinal length of the shaft;
a drum supported on the supports in a position that are coaxial with the central shaft, wherein the drum comprises outwardly projecting crop-engaging protuberances; and
a plastic filler comprising:
an outer surface that is generally cylindrical and immediately adjacent to an inner surface of the drum;
an inner surface adjacent to and surrounding the central shaft;
a first end adjacent to a first one of the plurality of radial supports; and
a second end adjacent to a second one of the plurality of radial supports, wherein the plastic filler fills a void and excludes contaminants from between the central shaft and the drum.

13. An agricultural combine comprising a chassis supported on at least one wheel, a feederhouse supported on the chassis, and configured to convey cut crop material from an agricultural harvesting head to a threshing, separating, and cleaning mechanism, and at least one cylindrical conveyor supported on the chassis in accordance with claim 12.

14. The cylindrical conveyor of claim 12, wherein the plastic filler comprises two or more thermoplastic bodies in an abutting relationship about an axis along which the elongate central shaft is to extend through the plastic filler, each of the bodies extending less than 360° about the axis, wherein the two or more thermoplastic bodies collectively extend 360° about the axis and define the cylindrical outer surface.

15. The cylindrical conveyor of claim 12, wherein the plastic filler comprises a thermoplastic body having an integral polymeric wall completely surrounding and enclosing a hollow interior, the integral polymeric wall forming at least a portion of the cylindrical outer surface.

16. The cylindrical conveyor of claim 12, wherein the plastic filler defines a generally cylindrical outer surface that is closely spaced to an inner surface of the drum over substantially an entire length of the plastic filler, and a cylindrical inner surface that extends around and is closely spaced to the central shaft over substantially an entire length of the central shaft.

17. The cylindrical conveyor of claim 12, wherein the plastic filler comprise two thermoplastic bodies that are fixed to each other with at least one fastener.

18. The cylindrical conveyor of claim 17, wherein the two thermoplastic bodies each comprise a hollow empty interior filled with air and wherein each of the two thermoplastic bodies comprises an aperture projecting into the cylindrical outer surface and receiving the at least one fastener, the aperture being disconnected from the hollow empty interior.

19. The cylindrical conveyor of claim 18, wherein the plastic filler comprises two hollow bodies that can be inserted individually and sequentially into the cylindrical conveyor through the opening.

20. The cylindrical conveyor of claim 12, wherein the drum comprises one or more individual cylinder segments that are removable from the cylindrical conveyor to thereby provide an opening in the drum, and further wherein the plastic filler is sized for insertion into cylindrical conveyor through the opening in the drum.

* * * * *